Patented Nov. 19, 1946

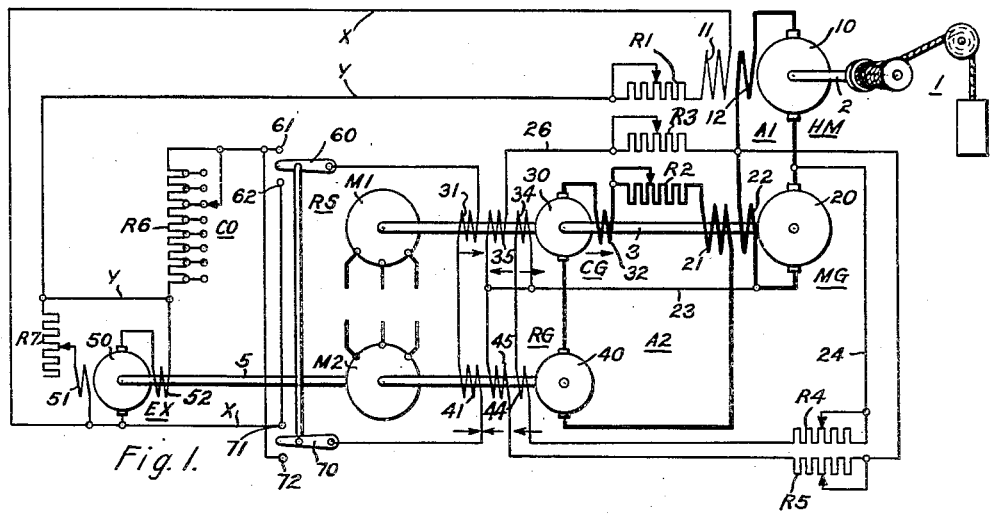

2,411,377

UNITED STATES PATENT OFFICE 2,411,377

CONTROL SYSTEM

Albert W. Kimball, Forest Hills, Pa., assignor to Westinghouse Electric Corporation, East Pittsburgh, Pa., a corporation of Pennsylvania Application June 14, 1944, Serial No. 540,175

7 Claims. (Cl. 172—239)

My invention relates to control systems of the variable voltage type and particularly to systems containing an auxiliary regulating generator for limiting the load current of a motor to be controlled, systems and generators of this kind being disclosed in the copending applications by J. G. Ivy, Serial No. 496,596, filed July 29, 1943, and Serial No. 532,975, filed April 27, 1944, both assigned to the assignee of the present application.

An object of my invention is to provide a control system of the type just referred to that produces not only a load limiting regulating effect, but is also distinguished by increased accuracy and speed as regards its response of the motor to changes in control adjustment while being substantially free of hunting even at a high rate of change of the control adjustments.

Another object of my invention, with reference to hoists, particularly mine hoists, is to provide a hoist control system in which the torque of the hoist motor and hence the stress on the ropes and other mechanical hoisting equipment are automatically limited due to control characteristics inherent in the electrical control system and in which the hoisting speed is a function of the selected controller position regardless of the amount of load, thus reducing the degree of attention and skill for operating the hoist.

In order to achieve these objects and in accordance with my invention, I provide the motor-generator combination of a variable voltage drive with two auxiliary generators for controlling the field excitation of the main generator. One of these auxiliary generators, hereinafter called the "control generator," has a self-excited field winding rated for just sustaining the armature voltage and further field means whose voltage is adjusted under control by the operator. (When referring in this specification to "self-excited" windings, I use this term for designating a field winding which, in contrast to a "separately excited" winding, derives its excitation from the energy generated in the armature of the same machine.) The other auxiliary generator, hereinafter called the "regulating generator," has saturation characteristic so that it generates an armature voltage substantially only when its field excitation exceeds a given finite magnitude. The regulating generator has field means excited in dependence upon the load current of the motor to be controlled. The armatures of both auxiliary generators are connected to a field winding of the above-mentioned main generator so that its excitation depends on both the operator-adjusted voltage and the saturation dependent voltage generated by the regulating generator.

These and other objects and features, as well as a specific example of a control system embodying them, will be apparent from the following description of the mine hoist control system shown diagrammatically in Fig. 1 of the drawing, and elucidated by the explanatory diagram of Figs. 2, 3 and 4, and the detail showing in Fig. 5 of the pole structure of an appertaining regulating generator.

Referring to the hoist control system shown in Fig. 1, the hoisting equipment proper is schematically indicated at 1 and includes a hoisting drum whose shaft 2 is mechanically connected to the armature 10 of a driving motor HM. The motor has a separately excited winding 11 and a compensating series field winding 12. The field winding 11 is energized from a current source of substantially constant voltage, and to this end is connected through an adjusting rheostat R1 to an exciter EX with an armature 50, two field windings 51 and 52, and a field rheostat R7. The adjustment of rheostats R1 and R7 need not be changed during the operation of the system.

The armature 10 of the hoist motor HM is connected, in load circuit A1, with the armature 20 of a main generator MG which forms the current source of circuit A1. The main generator MG has a main field winding 21 connected in a control circuit A2 which includes in series two voltage sources represented by the armatures 30 and 40 of a control generator CG and a regulating generator RG, respectively. A resistor R2 is series-arranged in circuit A2. Numeral 22 denotes a compensating or interpole winding of the main generator MG.

The control generator CG has four field windings 31, 32, 34, and 35 which cooperate in controlling the voltage impressed on the main generator field winding 21. The resultant energization of winding 21 determines the voltage and current supplied by the main generator armature 20 through circuit A1 to the hoist motor HM, thereby controlling the torque and speed of the hoisting equipment driven by the motor HM.

The current in circuit A2 is principally determined by the excitation of field winding 31, hereinafter called the "pattern field winding" of the control generator CG. Field winding 32 is self-energized and serves to amplify the control effect. While the connection of winding 32 in circuit A2 is shown as a series arrangement, a shunt winding may be used instead. Considering the excitation of pattern field winding 31 as a standard and assuming that main generator MG supplies energy to the hoist motor rather than functioning in a regenerative sense, both windings 32 and 35 act cumulatively while winding 34 acts differentially with respect to the pattern field winding 31.

Field winding 34 of control generator CG, hereinafter called the "voltage winding," is energized in dependence upon the voltage in load circuit A1, and to this end connected by leads 23 and 24 across the armature 20 of the main generator MG. Field winding 35 of control generator CG serves to compensate for the IR drop in the main circuit A1 and is connected across winding 22 through leads 23 and 26 and in series with a calibrating resistor R3. A resistor in circuit A1 may be used in place of coil 22, if desired, to obtain excitation for windings 35 and 45.

The pattern field winding 31, serving to determine the basic speed of the hoist motor as to direction and magnitude, is energized from a current source of constant voltage under control by operator-actuated regulating and reversing means. More in detail, pattern winding 31 is connected to mains X and Y of the exciter EX, a reversing switch RS being interposed in order to select the polarity of the pattern voltage impressed on field winding 31. The connection includes a control device CO which has a resistor R6 connected between main Y and reversing switch RS.

The reversing switch RS, as illustrated, has two movable contacts 60 and 70, each cooperating with two stationary contacts 61, 62 and 71, 72, respectively. In one position of switch RS, contact 60 is in engagement with contact 61, and contact 70 with contact 71, in order to energize the hoist motor HM for operation in the hoisting direction. In its other position, the reversing switch RS connects movable contacts 60 and 70 with stationary contacts 62 and 72, respectively, for controlling the hoist motor to operate in the lowering direction. The control device CO is preferably designed like a customary master controller, while the reversing switch RS and its contacts are preferably formed by electromagnetic contactors which are controlled in accordance with the selected hoisting or lowering position of the master controller. Since the particular design of the operator-actuated control elements, here represented by CO and RS, is not essential for the invention proper and, as such, need not involve novelty over the well known and customary master controllers, the simplified illustration in Fig. 1 has been chosen for the sake of convenience and clarity.

The armature 20 of the main generator MG and the armature 30 of the control generator CG are mounted on a common shaft 3 which, when in operation, is driven by a constant speed motor M1. Satisfactory operation can also be obtained if armature 30 is driven at constant speed while armature 20 is actuated by a separate drive whose speed does not vary excessively.

Armature 40 of regulating generator RG is mounted on a common shaft 5 with armature 50 of exciter EX. Shaft 5 is connected to a constant speed motor M2. It will be understood, however, that the illustrated arrangement can be modified by using a single constant speed motor for the operation of both shafts 3 and 5, or by connecting the two shafts 3 and 5 with each other so as to obtain a single motor generator unit.

The regulating generator RG has three field windings 41, 44, and 45. Field winding 41 corresponds to the pattern field winding 31 of the control generator CG and is connected in series with this winding so as to be energized by the pattern voltage adjusted at the controller CO. Field winding 44 of regulating generator RG is similar in function to the voltage winding 34 of control generator CG and is connected in series therewith across armature 20 of main generator MG, a calibrating resistor R4 being inserted in series with winding 44. Field winding 45, hereinafter called the "regulating winding," is excited in accordance with the current in the feed circuit A1 and to this end connected, through a calibrating rheostat R5 and leads 23 and 25, across the interpole or compensating winding 22 of generator MG in parallel to the IR-drop compensating field winding 35 of generator CG. When in operation, both windings 35 and 45 are traversed by a current whose magnitude varies in accordance with the voltage drop across the field winding 22 or other voltage measuring resistor in circuit A1 from whom the windings 35 and 45 derive their energization.

In order to achieve the control functions in accordance with the above stated objects of my invention, a particular design of the two auxiliary generators CG and RG and their appertaining field exciting means is necessary, as will be set forth presently.

The control generator CG is a small electric generator, similar in design to conventional exciters. Like exciters, it possesses the ability to accurately amplify small amounts of energy supplied to its fields into larger output amounts for the control of large electrical machines. However, the control generator possesses this ability to a much higher degree and thus represents a sensitive amplifier, capable of working on very small inputs to its fields to produce a very large output in the armature circuit. This sensitivity and amplification is due to the action of the self-energized field winding 32 which feeds a small portion of the control generator output power back into the control generator as excitation to produce still more output. The self-excited field is just sufficient to sustain the generated voltage but, by itself, is incapable of building up the output of the machine. Hence, the action of generator CG is always under the control of one or more of the separately excited field windings 31, 33, 34, and 35. Stating this another way, the resistance of the external control circuit A2 is adjusted relative to the self-excited field excitation so that the machine CG operates on its air gap line.

With this adjustment of the self-energized field, the ampere turns from the other field exciting means (windings 31, 33, 34, 35) can be balanced to the null point. This null condition exists when a field excitation which measures the motor speed is balanced by the field excitation of the pattern field winding caused by the standard or pattern voltage as adjusted by the operator by selecting the position of the master controller.

The motor speed corresponds to the fundamental equation:

$$\text{Speed} = \text{constant} \times (\text{armature voltage} - \text{armature IR drop})$$

As stated previously, the voltage responsive field winding 34 of generator CG measures the armature voltage of hoist motor HM, and the IR-drop field winding 35 measure the interpole IR drop which is proportional to the armature IR drop of the motor 10. The relative polarities of the two windings 34 and 35 are such that their ampere turns are subtractive and thus satisfy the above equation. The resultant speed measuring ampere turns of windings 35 and 34, as a whole, are balanced against those of the pattern field winding 31.

When the motor is running at the speed called for by any selected setting of the master controller, the speed measuring ampere turns cancel ampere turns of the pattern field. The entire excitation on the control generator comes now from the self-energized field, and there is no tendency to change the generator excitation. Should the motor speed vary from the proper value, the balance between the pattern and speed measuring excitations is disturbed. The resulting excess ampere turns then act to correct the error in motor speed. In this manner, the control generator CG provides a sensitive and accurate speed regulation.

The regulating generator RG is so designed that the component voltage imposed on circuit A2 remains substantially zero under normal operating and load conditions of the system, so that usually the entire field excitation of the main generator MG is produced by the control generator in the above-described manner. However, when the load current of the motor HM tends to exceed a given safe limit, the armature 40 of generator RG generates a bucking voltage which reduces the resultant field excitation of main field winding 21 sufficiently to prevent a further load increase in the motor circuit A1. To accomplish this limiting effect, the regulating generator RG has a special characteristic, similar to that shown in Fig. 2. This characteristic (curve V) differs from that of conventional machines by having an extended low voltage or zero voltage interval between points E and F which are both displaced from the zero point O by fixed amounts of excitation. Line R represents the resistance line of the generator.

A characteristic of this type can be obtained by providing the field poles of the generator with a saturable magnetic shunt as exemplified by Fig. 4.

In Fig. 5, numerals 5, 40, and 80 denote the shaft, armature, and stator frame, respectively, of the regulating generator RG. The pole structure comprises a base portion 81 in good magnetic contact with the stator frame and a pole shoe portion 82 adjacent to the armature. The main pole portion 83 is shunted by a saturable flux path 85 and contains an air gap or a magnetically reluctant shim 84, for instance of brass. The windings 41, 44 and 45 of the generator are arranged on the main pole portion 83. The air gap or shim at the top of the main pole portion carries the entire pole flux and hence does not influence the division of flux. It primarily determines the spacing F—E of the zero voltage interval as well as the shape of the characteristic beyond points F and E according to the diagram of Fig. 2. Because of this gap or shim, substantially all flux flows through the shunt since the reluctance of this path is low, and almost none of it is forced across the air gap into the armature to generate voltage, as long as the resultant field excitation is insufficient to saturate the shunt. The shunt 85 is so proportioned that it saturates at an excitation corresponding to points F and E of Fig. 2 and then becomes unable to carry more flux. Consequently, upon saturation of the shunt 85, an increasing field excitation forces flux across the air gap into the armature so that now a voltage is generated. The action, after the shunt has been saturated, is similar to that of a conventional machine.

Due to the fact that ampere turns from the regulating field winding 45 are used for saturating the magnetic shunt, the output voltage of generator RG is controlled in response to the armature current (and hence torque) of the hoist motor HM. As a result, the above-mentioned bucking voltage of armature 40 is not effective before the magnetic shunt on the regulating generator RG is saturated, and this saturation effect occurs only when the load current of the hoist motor has exceeded a given safe limit value. The control fields of the regulating generator do not saturate the shunt when performing their normal function since they are balanced against each other so that their net ampere turns are normally zero. In other words, the small transient departures from zero, necessary to obtain the desired regulating function of field windings 41 and 44, is insufficient to cause appreciable saturation in the shunt, although these windings are effective to produce the regulating anti-hunting action mentioned presently.

When during a control operation initiated by the operator, the hoist motor approaches full speed, and the voltage of the main generator MG also approaches maximum, the corrective effect required by the RG armature 40 to limit the current in winding 21 of generator MG will be less because the resultant speed-measuring field of the control generator will then cancel a greater portion of pattern field ampere turns (winding 31) which are tending to cause excessive load voltage and current. The voltage field (winding 44) on the regulating generator will also cancel pattern field ampere turns (winding 41), and this occurs in the same proportion as in the control generator so that the corrective effect of the component voltage generated by the armature 40 is reduced in the right amount to maintain the same motor armature current in circuit A1. It is this simultaneous occurrence, and its corrective effect, of the regulating action of the speed-dependent and operator-adjusted voltages that decreases the tendency of hunting and thus increases the accuracy, reliability, and permissible speed of control. It is essential in this connection that the component voltage of the regulating generator 40 is directly introduced into the field circuit of the main generator MG so that the inherent time delays of the current regulating means are reduced to a minimum.

In order to further elucidate the above-described operation of the system, reference is had to the schematic diagram of Fig. 3.

In this diagram the values along the ordinate represent the output voltage of the control generator CG, while the values along the abscissa represent the resultant ampere turns of the field winding means of this same generator necessary for obtaining the correlated output voltage. The straight line denoted by RL indicates the resistance line of the circuit A2 while the saturation curve SC indicates the relation of ampere turns to generated volts under operating conditions where the output voltage of the regulating generator RG is zero. Curve DC in Fig. 3 represents the displaced characteristic which occurs when the regulating generator RG generates output voltage due to the occurrence of an overload in the load circuit of the hoisting motor, as explained in the foregoing. This displacement reduces the field excitation of the main generator field winding 21 in accordance with the voltage value denoted by RV in Fig. 3. The resulting action is a corresponding reduction in the armature voltage of the main generator MG, and this action continues until the current in the voltage coil 34 on the control generator CG has caused a difference between the pattern and other control fields equal to the ampere turns indicated by DV in Fig. 3. From then on, the control generator CG continues operating in accordance with the displaced saturation curve DC.

The shape and slope of the current limiting portion of the voltage-ampere turns characteristic of the control generator can be modified by varying the combination of fields on the regulating generator RG. For instance, with the field windings arranged as shown in Fig. 1, the characteristic is of the type represented by curve CI in Fig. 4. By providing a current responsive coil 44 on the regulating generator RG but omitting the current coil 34 on the control generator CG, the characteristic can be changed to the type represented by curve C2 in Fig. 4.

If desired, the regulating effect of the generator RG can be amplified by providing it with a self-excited shunt field winding. It is further possible to omit a control generator of the type represented by generator CG in Fig. 1 and to arrange the appertaining control windings directly on the main generator, although it will be understood that such a system is not as suitable for high power outputs as the one according to the above described embodiment of Fig. 1.

These and other modifications and alterations will be obvious to those skilled in the art and are intended to be within the scope of the essential features of my invention as set forth in the claims appended thereto.

I claim as my invention:

1. A variable voltage control system comprising a main generator having an output circuit and a main field winding for controlling the voltage of said circuit, a control generator and a regulating generator connected with said main field winding for exciting it in accordance with a resultant voltage depending upon the component voltages generated by said latter two generators respectively, each of said latter generators having field means for controlling said respective component voltages, operator-controlled circuit means for providing an adjustable pattern voltage and circuit means for providing a control voltage variable in accordance with the voltage of said circuit, said different circuit means being connected with said field means of said control generator for exciting said control generator in accordance with the differential value of said pattern and control voltages, said regulating generator having a saturation characteristic so as to vary the rate of change of said appertaining component voltage when the excitation of its field means passes through a given finite value, and means for exciting said field means of said regulating generator in dependence upon the load current in said circuit, whereby said load current is substantially limited to a safe maximum value.

2. A variable voltage control system comprising a main voltage generator having an output circuit and a main control means for varying the voltage of said circuit, a controlling voltage source and a regulating voltage source both connected to said main control means for controlling it in accordance with a resultant effect of the component voltages of said latter two sources, each of said latter two sources having means for controlling said component voltages respectively, operator-controlled circuit means for providing an adjustable pattern voltage and circuit means for providing a control voltage variable in accordance with the voltage of said circuit, said different circuit means being connected with said control means of said control voltage source for varying said appertaining component voltage in accordance with the differential value of said pattern and control voltages, and means for causing said regulating voltage source to vary the rate of change of its appertaining voltage component when the current in said output circuit passes through a given finite value, whereby said current is substantially limited to a given maximum value.

3. A motor control system comprising a variable speed direct current motor, a main voltage supply means having a load circuit connected to said motor for energizing the latter and main control means for varying the voltage of said circuit, a controlling voltage source and a regulating voltage source both connected to said main control means for controlling it in accordance with a resultant effect of the component voltages of said latter two sources, each of said latter two sources having means for controlling said component voltages respectively, operator-controlled circuit means for providing an adjustable pattern voltage and circuit means for providing a control voltage variable substantially in accordance with the speed of said motor, both said circuit means being connected with said control means of said control voltage source for varying said appertaining component voltage in accordance with the differential value of said pattern and control voltages, and means for causing said regulating voltage source to vary the rate of change of its appertaining voltage component when the load current of said motor exceeds a given maximum value.

4. A variable voltage control system comprising a main generator having an output circuit and a main field winding for controlling the voltage of said circuit, a control generator and a regulating generator connected with said main field winding for exciting it in accordance with a resultant voltage depending upon the component voltages generated by said latter two generators respectively, each of said latter generators having field means for controlling said respective component voltages, operator-controlled circuit means for providing an adjustable pattern voltage and circuit means for providing a control voltage variable in accordance with the voltage of said circuit, said different circuit means being connected with said field means of said control generator and regulating generator for exciting both in accordance with the differential value of said pattern and control voltages, said regulating generator having a saturation characteristic so as to vary the rate of change of said appertaining component when the current in said output circuit passes through a given finite value, whereby said current is substantially limited to a given maximum value.

5. A motor control system comprising a variable speed direct current motor, a main generator having an armature circuit connected with said motor for energizing the latter and a main field winding for controlling the voltage of said circuit, a control generator and a regulating generator connected with said main field winding for exciting it in accordance with a resultant voltage depending upon the component voltages generated by said latter two generators respectively, each of said latter generators having field means for controlling said respective component voltages, operator-controlled circuit means for providing an adjustable pattern voltage and circuit means for providing a control voltage variable in accordance with the voltage of said circuit, said different circuit means being connected with said field means of said control generator and regulating generator for exciting both in accordance with the differential value of said pattern and control voltages, said regulating generator having a saturation characteristic so as to vary the rate of change of said appertaining component voltage when the excitation of its field means passes through a given finite value, and means for exciting said field means of said regulating generator in dependence upon the load current in said circuit, whereby said load current is substantially limited to a safe maximum value.

6. A variable voltage control system comprising a main generator having an output circuit and a main field winding for controlling the voltage of said circuit, a control generator and a regulating generator connected with said main field winding in opposition to each other for exciting it in accordance with the resultant differential of the component voltages generated by said latter two generators respectively, each of said latter generators having field means for controlling said respective component voltages, operator-controlled circuit means for providing an adjustable pattern voltage and circuit means for providing a control voltage variable in accordance with the voltage of said circuit, said different circuit means being connected with said field means of said control generator and regulating generator for exciting both in accordance with the differential value of said pattern and control voltages, said regulating generator having saturation characteristic so that its component voltage is normally substantially zero, and means for exciting said field means of said regulating generator so as to cause said appertaining component voltage to assume an effective value when the load current in said circuit exceeds a given limit magnitude.

7. A motor control system comprising a variable speed direct current motor, a main generator having an armature circuit connected with said motor for energizing the latter and a main field winding for controlling the voltage of said circuit, a control generator and a regulating generator having respective armatures series-connected with said main field winding in opposition to each other for exciting said main field winding in accordance with the resultant differential of the component voltages generated by said latter two generators respectively, each of said latter generators having field means for controlling said respective component voltages, operator-controlled circuit means for providing an adjustable pattern voltage and circuit means for providing a control voltage variable in accordance with the voltage of said circuit, said different circuit means being connected with said field means of said control generator and regulating generator for exciting both in accordance with the differential value of said pattern and control voltages, said regulating generator having saturation characteristic so that its component voltage is normally substantially zero, and means for exciting said field means of said regulating generator so as to cause said appertaining component voltage to assume an effective value when the load current in said circuit exceeds a given limit magnitude.

ALBERT W. KIMBALL.